(12) United States Patent
Muegge et al.

(10) Patent No.: US 6,267,488 B1
(45) Date of Patent: Jul. 31, 2001

(54) LIGHT APPARATUS FOR VEHICLES

(75) Inventors: Martin Muegge, Geseke; Ralf Seiger, Lippstadt, both of (DE)

(73) Assignee: Hella KG & Hueck Co., Lippstadt (DE)

(*) Notice: Subject to any disclaimer, the term of this patent is extended or adjusted under 35 U.S.C. 154(b) by 0 days.

(21) Appl. No.: 09/318,627

(22) Filed: May 26, 1999

(30) Foreign Application Priority Data

May 29, 1998 (DE) ............................................. 198 24 053

(51) Int. Cl.[7] ....................................................... F21V 1/00
(52) U.S. Cl. ............................ 362/509; 362/351; 362/539
(58) Field of Search ................................... 362/538, 539, 362/507, 351, 359, 361, 516, 214, 303, 305, 509

(56) References Cited

U.S. PATENT DOCUMENTS

| 1,367,964 | 2/1921 | Hawthorne | 362/280 |
|---|---|---|---|
| 5,047,903 | * 9/1991 | Choji | 362/539 |
| 5,251,110 | * 10/1993 | Leleve | 362/510 |
| 5,678,916 | * 10/1997 | Watanabe | 362/465 |
| 6,000,816 | * 12/1999 | Serizawa | 362/297 |
| 6,007,221 | * 12/1999 | Taniuchi | 362/465 |
| 6,012,830 | * 1/2000 | Fraizer | 362/529 |

FOREIGN PATENT DOCUMENTS

| 2 333 106 | 2/1974 | (DE) . |
|---|---|---|
| 0 646 495 A1 | 4/1995 | (EP) . |

\* cited by examiner

Primary Examiner—Sandra O'Shea
Assistant Examiner—Hargobind S. Sawhney

(57) ABSTRACT

A light apparatus for vehicles includes a housing, which is closed by a closure pane. In the housing is installed at least one reflector with a corresponding light source. A cover which supports a light shield for the light source is located between the reflector and the closure pane.

14 Claims, 3 Drawing Sheets

LIGHT APPARATUS FOR VEHICLES

BACKGROUND OF THE INVENTION

This invention concerns a light apparatus for vehicles, of a type having a housing, a transparent closure pane for closing the housing, at least one reflector in the housing, a light source corresponding to the reflector, a light shield placed between the light source and the closure pane and a frame-like cover peripherally encompassing the reflector.

Such a lighting apparatus for vehicles has been disclosed by EP 0 646 495 A1. A headlamp with two reflectors serves as a light apparatus for motor vehicles. Both reflectors are placed in a pot shaped housing and are commonly covered by a light-transmissive closure pane. An outer rim of the closure pane is installed on an outer rim of the pot shaped housing. A cover is placed between the reflectors and the closure pane, which peripherally encompasses, or covers, the reflectors. The cover is made of plastic and is affixed to the closure pane. In the case of a closure pane which exhibits at least some optics-free areas, the cover blocks an interior of the pot shaped housing against viewing from outside. A light source is assigned to each of the two reflectors, respectively, which is formed by an incandescent lamp. The incandescent lights are installed through respective access openings in vertex areas of the reflectors. Hood-like light shields are between the light sources and the closure pane. The light shields can serve as decorative caps and are connected to rims of the receiving openings of the reflectors by long support arms.

In this regard, it is disadvantageous, when mounting is done with poor craftsmanship, that the reflecting surfaces of the reflectors can be damaged and, because the light shields are fastened on the reflectors, effective sizes of reflection surfaces are reduced as arc yields of light from the reflectors.

A purpose of this invention is to provide a light apparatus for a vehicle of the generic type described in the opening paragraph above, in which the light shield is uncomplicated in structure and easy to install, without a danger of damaging the reflecting surface of the reflector and in which securement of the light shield does not cause a diminution of a reflecting area of the reflector.

SUMMARY OF THE INVENTION

According to principles of this invention, a frame-like cover for such a light apparatus is also a holder for the light shield. The cover which holds the light shield is either securely affixed on an outside rim of the housing or to the closure pane. Since the reflector has no connection structure for the fastening the light shield, a significant loss of reflection area is avoided. Further, a material of which the shield is made need not be correlated to that of the reflector. A galvanized shield affixed to the reflector would lead to contact corrosion with an aluminum surface of the reflector.

BRIEF DESCRIPTION OF THE DRAWINGS

The invention is described and explained in more detail below using an embodiment shown in the drawings. The described and drawn figures can be used individually or in preferred combinations in other embodiments of the invention. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DETAILED DESCRIPTION OF THE INVENTION

Figure 1:
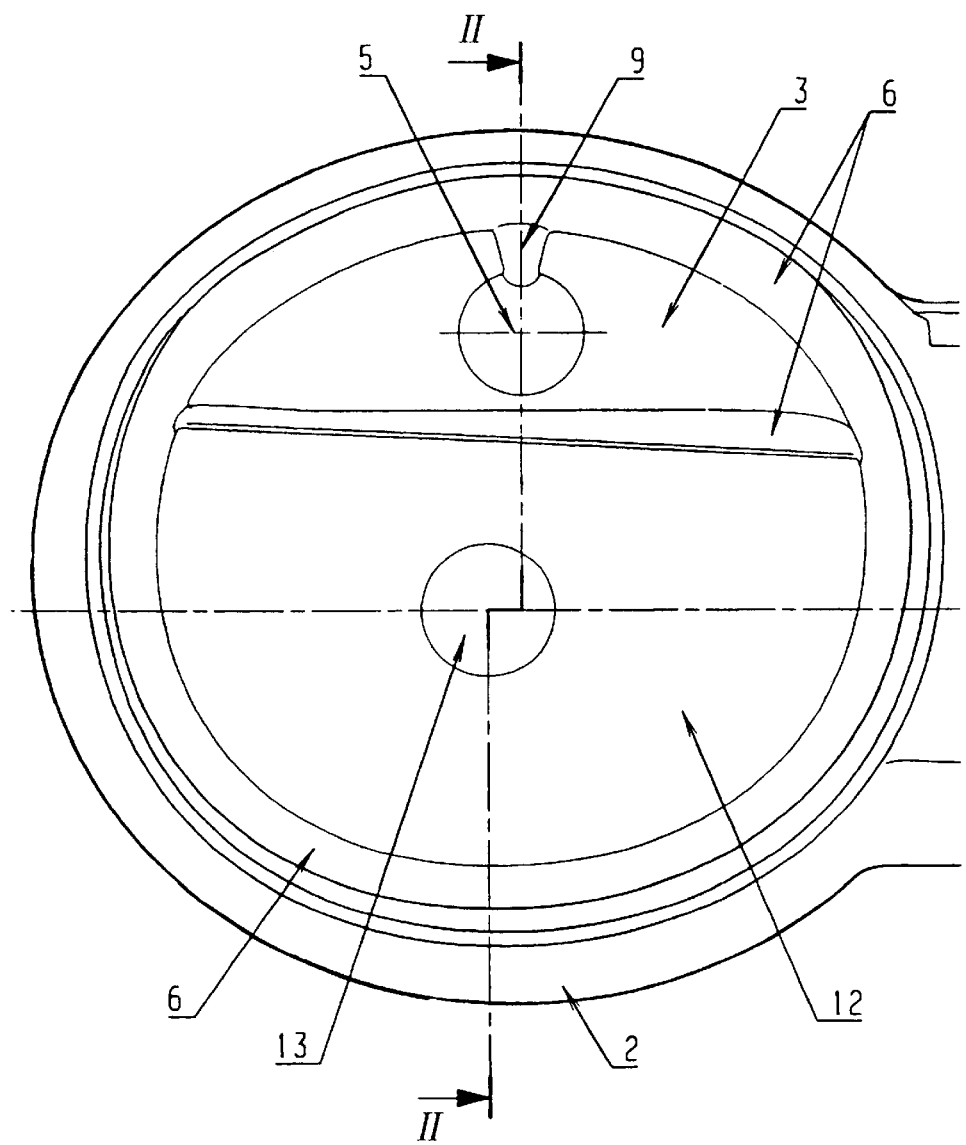
FIG. 1 is a front view of a section of a headlight employing principles of this invention, with a reflector for low-beam light and a reflector for blink light.

A headlight comprises a pot shaped housing 1 of plastic, a front opening of which is closed by a plastic, light-transmissive closure pane 2. An outer rim of the closure pane 2 is inset into a corresponding receiving bed 14 of an outer rim of the pot shaped housing 1. The closure pane 2 is tightly sealed to the housing with adhesive applied in the receiving bed 14. The section shown in FIG. 1 of the headlight is circular and has in its lower area a reflector 12 for low beams and in an upper area a reflector 3 for a blinker light. The reflectors are bowl shaped and their adjacent rims extend equidistant to one another. The reflectors 3, 12 respectively have at their apexes access openings 15, 16. In the opening 15 is a light source 4 comprising one lamp set into its socket 17, while in the access opening 16 is a lamp serving as a light source 18. A peripheral, frame-like cover 6 in an interior of the headlight is between the reflectors 3, 12 and the closure pane 2,. This frame-like cover is of plastic and is firmly affixed by holding lugs 19 engaging the receiving bed 14 of the housing 1. The frame-like cover 6 has a double-walled ring section 20, which peripherally encompasses the two reflectors 3, 12 as well as a cross piece 21 extending between the two reflectors.

The lamp serving as the light source 4 has a yellow glass bulb 11. A hood-like light shield 5 is arranged between the light source and the closure pane 2, which by means of a structural channel support element 9 is molded onto an upper inside sidewall of the doublewalled ring section 20 of the cover part 6. An upper surface 7 of the light shield 5 and the cover 6, proximal to the closure pane 2, has a highly sparkling, silver colored, coating, as do also outer surfaces 8 of the reflectors 3 and 12.

Figure 2:
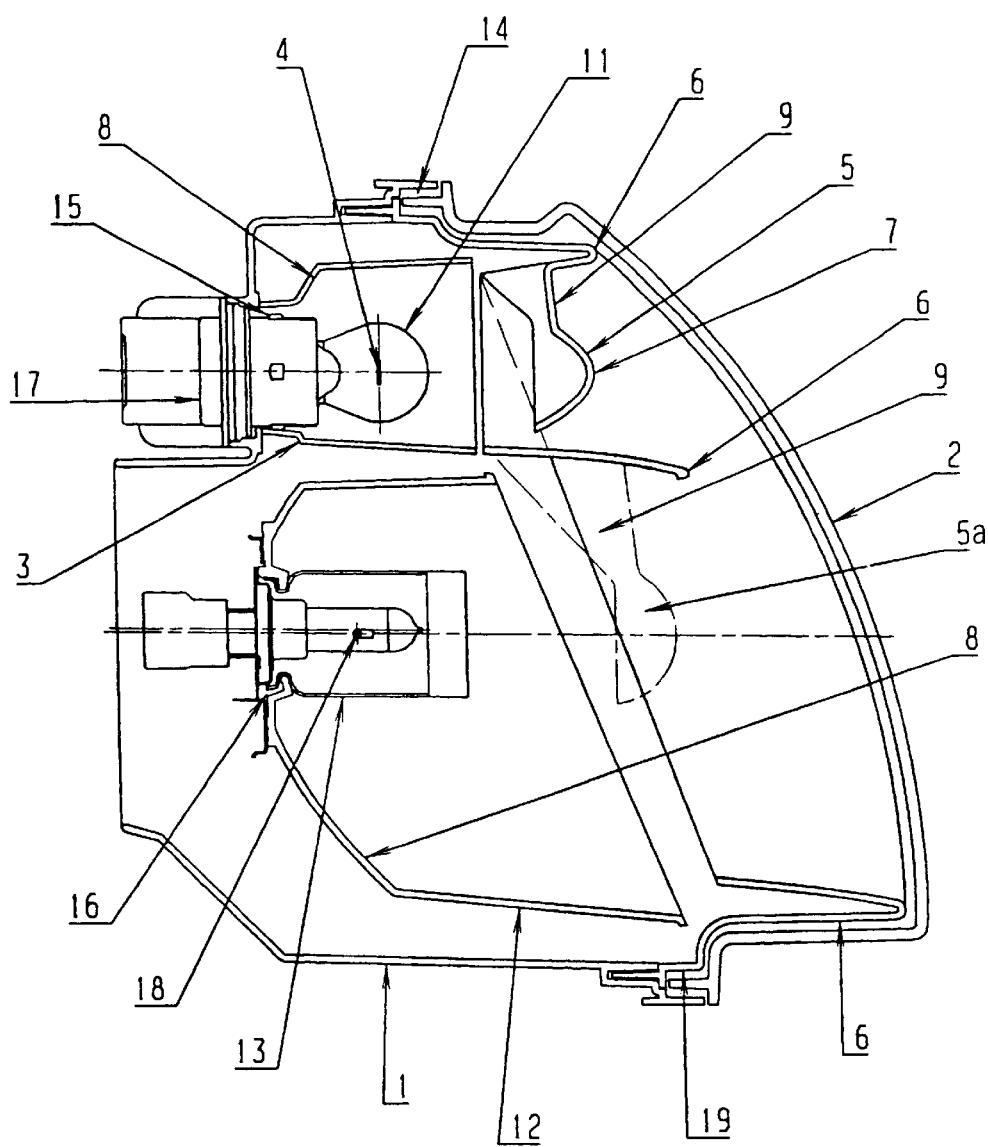
FIG. 2 is a cross sectional view taken on line II—II in FIG. 1, through the headlamp for low beams and blinker light.
Figure 3:
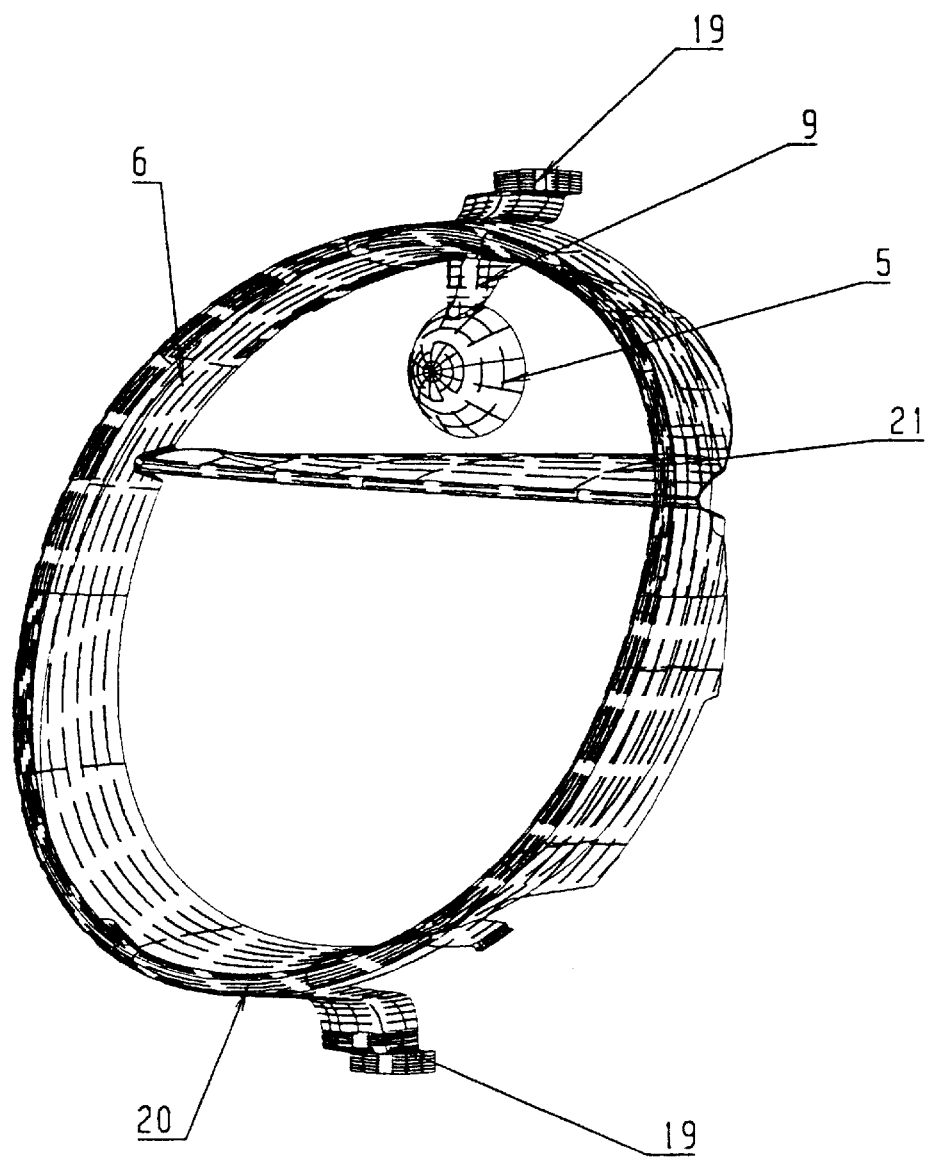
FIG. 3 is a perspective view of a cover, installed in a manner of a peripheral frame in an interior of the headlight.

In FIG. 2, a light shield 5a is shown in dashed lines between the light source 18 and the closure pane 2 for lower beams. The light shield 5a is molded, along with its carrier element 9 onto a side surface of the cross piece 21 of the cover 6. A beam screen 13, which blocks light beams emerging directly from the light source 18 toward a forward reflector rim, is placed between the light source 18 and the light shield 5a. The beam screen 13 is fastened by support arms onto a rim of the access opening 16 on the reflector 12. The light shields and 5a, respectively corresponding to the reflector 3 and the reflector 12, serve as ornamental caps.

The light apparatus for vehicles can also be designed for tail light applications for motor vehicles.

It is of advantage, that the light shield is connected with an upper inside of the cover by a side-located carrying element. Thereby, at least a section of a carrying element is screened from a slanted view from above by the cover.

In an especially advantageous embodiment of the invention, the cover is a one piece component with the light shield. This integrated component is economical to manufacture, when it is made of plastic by injection molding.

The light shield and the cover which carries the shield, are designed to be stiff and resistant to twisting. For this purpose, the shield is built as a hood and the carrying element is a structural channel with the hood and the channel being open towards the reflector. Further, to provide rigidity, the shield is molded onto the inner wall of the cover in the case of a double walled cover. Also, the cover and the light shield can be manufactured together, of plastic, using an injection molding process, with no additional adjustable mold tool parts.

The headlight makes a harmonic general impression, when the light shield and the cover present the same colors on their sides toward the closure pane. The colored surfaces can be made from a highly brilliant, silver colored coating.

When a lighting apparatus of this invention is applied to a blinker light, a decorative cap can advantageously serve as a light shield which corresponds to a light-source lamp having a yellow glass bulb. In this regard, the light shield serves exclusively for blocking the yellow lamp.

In the case of a lighting apparatus with a headlight reflector, it is advantageous for the light shield to be a decorative cap for the light source of the headlight and/or a beam screen secured on the reflector. A beam screen supported on the reflector indicates a low-beam headlight, while a headlight without a beam screen normally provides distant beams.

What is claimed is:

1. A lighting apparatus for vehicles including a housing having a front opening, a light-transmissive closure pane connected to said housing covering the front opening, at least one reflector in said housing, a light source corresponding to the reflector, a light shield between the light source and the closure pane for shielding view of the light source from an observer positioned directly in front of the lighting apparatus, and a cover which surrounds the reflector and extends to the side of the reflector for shielding view of the interior of the housing beside the reflector by an observer positioned in front of the lighting apparatus, wherein, the cover also supports the light shield.

2. The lighting apparatus as in claim 1, wherein the light shield is engaged to an upper, interior side of the cover.

3. The lighting apparatus as in claim 1, wherein the light shield is connected to the cover by a side support element.

4. The lighting apparatus as in claim 1, wherein the cover together with the light shield are constructed as one piece.

5. The lighting apparatus as in claim 3, wherein the light shield is hood-like in structure and the support element is channel-like in structure, with respective hood-like and channel-like elements thereof opening toward the reflector.

6. The lighting apparatus as in claim 5, wherein the light shield is molded of plastic onto an inner wall of the cover, and the cover is double walled.

7. The lighting apparatus as in claim 1, wherein the light shield and the cover exhibit a same color surface on sides thereof facing the closure pane.

8. The lighting apparatus as in claim 1, wherein the lighting apparatus is a blinker light and wherein the light shield is an ornamental cap for the light source, with the light source being a yellow glass bulb.

9. The lighting apparatus as in claim 1, wherein the lighting apparatus is a headlight and wherein the light shield is an ornamental cap for the light source, and wherein is further included a beam screen secured on the reflector.

10. A lighting apparatus for vehicles including a housing, a light-transmissive closure pane connected to said housing, at least one reflector in said housing, a light source corresponding to the reflector, a light shield between the light source and the closure pane, and a cover which surrounds the reflector, wherein the cover also supports the light shield, wherein the light shield is connected to the cover by a side support element, and wherein the light shield is hood-like in structure and the support element is channel-like in structure, with respective hood-like and channel-like elements thereof opening toward the reflector.

11. The lighting apparatus as in claim 10, wherein the light shield is molded of plastic onto an inner wall of the cover, and the cover is double walled.

12. A lighting apparatus for vehicles including a housing, a light-transmissive closure pane connected to said housing, at least one reflector in said housing, a light source corresponding to the reflector, a light shield between the light source and the closure pane, and a cover which surrounds the reflector, wherein, the cover also supports the light shield, wherein the lighting apparatus is a blinker light and wherein the light shield is an ornamental cap for the light source, with the light source being a yellow glass bulb.

13. A lighting apparatus for vehicles including a housing, a light-transmissive closure pane connected to said housing, at least one reflector in said housing, a light source corresponding to the reflector, a light shield between the light source and the closure pane, and a cover which surrounds the reflector, wherein the cover also supports the light shield, wherein the lighting apparatus is a headlight, wherein the light shield is an ornamental cap for the light source, and wherein is further included a beam screen secured on the reflector.

14. A lighting apparatus for vehicles including a housing, a light-transmissive closure pane connected to said housing, at least one reflector in said housing, a light source corresponding to the reflector, a light shield between the light source and the closure pane, and a cover which surrounds the reflector, wherein, the cover also supports the light shield, wherein the light shield is connected to the cover by a side support element and wherein the light shield is molded of plastic onto an inner wall of the cover, and the cover is double walled.

* * * * *